(12) United States Patent
Madabhushi et al.

(10) Patent No.: US 12,412,405 B2
(45) Date of Patent: Sep. 9, 2025

(54) BATCH EFFECT MITIGATION IN DIGITIZED IMAGES

(71) Applicant: Case Western Reserve University, Cleveland, OH (US)

(72) Inventors: Anant Madabhushi, Shaker Heights, OH (US); Andrew Janowczyk, East Meadow, NY (US)

(73) Assignee: Case Western Reserve University, Cleveland, OH (US)

( * ) Notice: Subject to any disclaimer, the term of this patent is extended or adjusted under 35 U.S.C. 154(b) by 421 days.

(21) Appl. No.: 17/891,321

(22) Filed: Aug. 19, 2022

(65) Prior Publication Data

US 2023/0059717 A1   Feb. 23, 2023

Related U.S. Application Data

(60) Provisional application No. 63/235,335, filed on Aug. 20, 2021.

(51) Int. Cl.
| | | |
|---|---|---|
| *G06V 10/776* | (2022.01) | |
| *G06V 10/48* | (2022.01) | |
| *G06V 10/762* | (2022.01) | |
| *G06V 20/69* | (2022.01) | |

(52) U.S. Cl.
CPC .......... *G06V 20/695* (2022.01); *G06V 10/48* (2022.01); *G06V 10/7635* (2022.01); *G06V 10/776* (2022.01)

(58) Field of Classification Search
CPC ......... G06T 7/0012; G06T 2207/20081; G06T 2207/30024; G06V 20/69; G06V 20/695; G06V 10/48; G06V 10/762; G06V 10/7635; G06V 10/776; G06V 10/774
See application file for complete search history.

(56) References Cited

U.S. PATENT DOCUMENTS

| | | | |
|---|---|---|---|
| 11,682,098 B2 * | 6/2023 | Yip | G06T 7/11 382/133 |
| 2019/0266726 A1 * | 8/2019 | Madabhushi | G06T 7/0012 |

* cited by examiner

*Primary Examiner* — Sumati Lefkowitz
*Assistant Examiner* — Michael Adam Shariff
(74) *Attorney, Agent, or Firm* — Eschweiler & Potashnik, LLC

(57) ABSTRACT

The present disclosure relates to a non-transitory computer-readable medium storing computer-executable instructions that, when executed, cause a processor to perform operations. The operations include extracting one or more image characterization metrics from respective ones of a plurality of digitized images within an imaging data set. The plurality of digitized images have batch effects. The operations further include identifying a plurality of batch effect groups of the digitized images using the one or more image characterization metrics, and dividing the plurality of batch effect groups between a training set and/or a validation set. The training set and/or the validation set include some of the plurality of digitized images associated with respective ones of the plurality of batch effect groups.

20 Claims, 11 Drawing Sheets

BATCH EFFECT MITIGATION IN DIGITIZED IMAGES

REFERENCE TO RELATED APPLICATION

This Application claims the benefit of U.S. Provisional Application No. 63/235,335, filed on Aug. 20, 2021, the contents of which are hereby incorporated by reference in their entirety.

FEDERAL FUNDING NOTICE

This invention was made with government support under CA239055 awarded by the National Institutes of Health. The government has certain rights in the invention.

BACKGROUND

Batch effects are technical sources of variation (e.g., non-biological factors) that are present between different groups or batches of data. Batch effects may be generated within a set of data due to differences in preparation of samples within different batches, differences in a type or model of a machine used to collect the data of the different batches, or even by different technicians that collect the data of the different batches.

BRIEF DESCRIPTION OF THE DRAWINGS

The accompanying drawings, which are incorporated in and constitute a part of the specification, illustrate various example operations, apparatus, methods, and other example embodiments of various aspects discussed herein. It will be appreciated that the illustrated element boundaries (e.g., boxes, groups of boxes, or other shapes) in the figures represent one example of the boundaries. One of ordinary skill in the art will appreciate that, in some examples, one element can be designed as multiple elements or that multiple elements can be designed as one element. In some examples, an element shown as an internal component of another element may be implemented as an external component and vice versa. Furthermore, elements may not be drawn to scale.

DETAILED DESCRIPTION

Figure 1:
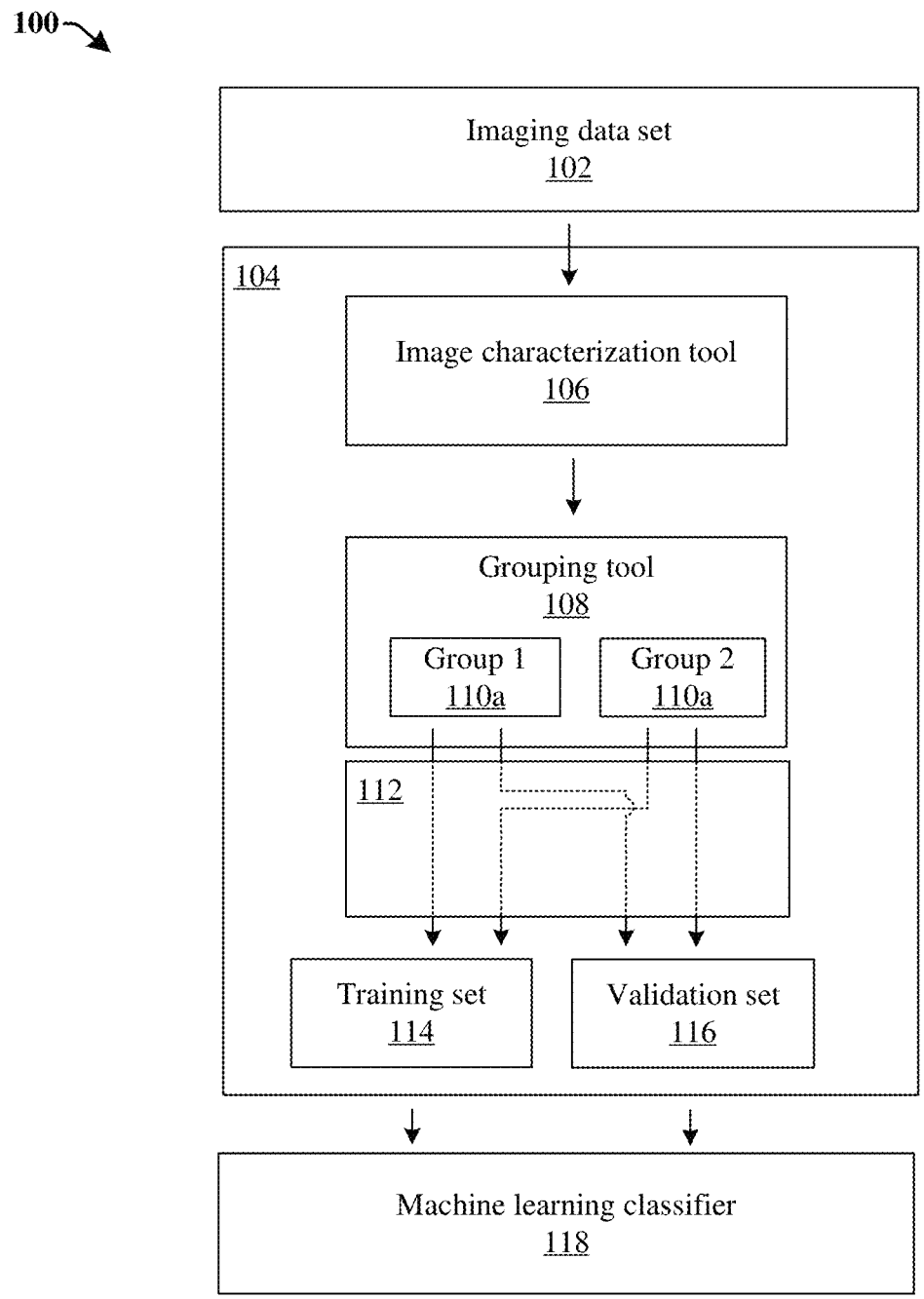
FIG. 1 illustrates some embodiments of a block diagram illustrating a method and/or apparatus for mitigating batch effects by utilizing one or more image characterization metrics to systematically partition digitized images into training and/or validation sets.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one of ordinary skill in the art, that one or more aspects described herein may be practiced with a lesser degree of these specific details. In other instances, known structures and devices are shown in block diagram form to facilitate understanding.

Batch effects are systematic technical differences, not related to biological variations, which are imparted on data as a result of differences in pre-processing (e.g., measuring) between different batches during the formation of the data. For example, Hematoxylin and Eosin (H&E) staining is commonly used in the formation of whole side images (WSI) that are used by pathologists to view cellular and/or tissue structure details. H&E staining is performed by staining tissue with hematoxylin (a stain that has a blue color that binds with individual cell nuclei) and Eosin (a counter-stain that has a pink color that emphasizes a texture of tissue). When digitized images are formed from H&E slides at different sites (e.g., different hospitals and/or labs) and/or at different times (e.g., slides generated from a site 5 years ago and today are also likely to be quite different due to aging of slides, bleaching slides with light, etc.), the digitized images may look different due to batch effects. For example, a digitized image (e.g., a WSI) formed at a first hospital may have a relatively high degree of blue, while a digitized image formed at a second hospital may have a relatively high degree of pink.

Such batch effects in digitized images can make it difficult to train machine learning classifiers to achieve consistent results over many different sites and/or times. For example, a machine learning classifier trained on digitized images from the first hospital (e.g., having predominately dark stained digitized images) will have a difficult time correctly classifying digitized images from the second hospital (e.g., having predominately light stained digitized images) due to batch effects.

Typically, machine learning classifiers are trained using datasets formed from digitized images collected from many different sites (e.g., many different hospitals and/or labs). However, it has been appreciated that the negative risks of batch effects may still be present in such datasets. This is because a large dataset having digitized images from different sites may be randomly separated to form a training set a validation set. The randomness of the separation can result in the training set having digitized images with similar batch effects and the validation set having digitized images with different batch effects than the training set (e.g., having most diverse batch effect counterparts with a maximal Euclidean distance between the quality control metrics). Training a machine learning classifier on a training set that has different batch effects than a subsequently used validation set can reduce model robustness (e.g., by up to approximately 20%), and in worst cases, lead to inaccurate conclusions.

In some embodiments, the present disclosure relates to a batch effect mitigation method and/or apparatus that utilizes one or more image characterization metrics to systematically partition batch effect groups of digitized images having similar presentational properties between training and validation sets. The method determines image characterization metrics (e.g., quality control metrics) for a plurality of digitized images. Based upon the image characterization metrics, the plurality of digitized images are clustered into batch effect groups having similar presentational properties. The presentational properties are indicative of batch effects. The batch effect groups are systematically partitioned between a training set and a validation set (e.g., a testing set) by placing digitized images from each of the batch effect groups into both the training and validation sets. By placing digitized images from different batch effect groups into both the training and validation sets, a machine learning classifier will be trained on images having different batch effects, thereby ameliorating the potential negative consequences of batch effects via balancing of their properties.

FIG. 1 illustrates some embodiments of a block diagram 100 illustrating a method and/or apparatus for mitigating batch effects by utilizing one or more image characterization metrics to systematically partition digitized images between training and validation sets.

As shown in block diagram 100, an imaging data set 102 is formed. The imaging data set 102 includes a plurality of digitized images respectively comprising imaging data for a patient. In some embodiments, the imaging data set 102 includes digitized pathology images obtained from one or more pathological tissue samples taken from a patient's body. In some embodiments, the digitized images may comprise whole slide images (WSIs). In other embodiments, the imaging data set 102 includes digitized scan data taken from radiological images (e.g., images obtained using Magnetic resonance (MR), computerized tomography (CT), positron emission tomography (PET), or the like).

A batch effect mitigation tool 104 is configured to receive the plurality of digitized images within the imaging data set 102. The batch effect mitigation tool 104 is configured to detect image characterization metrics of the plurality of digitized images and to generate a plurality of batch effect groups 110a-110b (e.g., batch effect clusters) based on the image characterization metrics. The plurality of batch effect groups 110a-110b respectively comprise digitized images having similar presentational properties (e.g., a tissue color, a background color, brightness, contrast, etc.) that are indicative of batch effects. The batch effect mitigation tool 104 is further configured to systematically break apart each of the plurality of batch effect groups 110a-110b into a training set 114 and/or a validation set 116 (e.g., a testing set) by separating (e.g., dividing) digitized images associated with each of the plurality of batch effect groups 110a-110b between the training set 114 and/or the validation set 116.

In some embodiments, the batch effect mitigation tool 104 may comprise an image characterization tool 106, a grouping tool 108, and a partitioning tool 112. The image characterization tool 106 is configured to determine one or more image characterization metrics relating to the plurality of digitized images within the imaging data set 102. In some embodiments, the image characterization tool 106 may comprise a quality control metric detector configured to act upon the plurality of digitized images within the imaging data set 102 and to determine one or more quality control metrics relating to the plurality of digitized images. For example, the quality control metric detector may determine one or more quality control metrics relating to a first digitized image, one or more quality control metrics relating to a second digitized image, etc. The one or more quality control metrics may comprise non-biological metrics such as stain metrics (e.g., a tissue color, a background color, a stain intensity, etc.), brightness, thickness, contrast, saturation, white balance, microns per pixel, magnification, and/or the like. In some additional embodiments, the one or more image characterization metrics may comprise biological metrics (e.g., a number of segmentations within a digitized image, a size of segmentations, a shape of segmentations, etc.). In yet additional embodiments, the one or more image characterization metrics may also include metadata relating to the formation of the digitized images (e.g., a name of site from which the digitized image originated, a date that a slide used to form the digitized image was formed, a patient ID, or the like).

The grouping tool 108 is configured to receive the image characterization metrics associated with each of the plurality of digitized images from the image characterization tool 106. Based upon the image characterization metrics, the grouping tool 108 is configured to place the plurality of digitized images into the plurality of batch effect groups 110a-110b. The plurality of batch effect groups 110a-110b comprise digitized images that have similar presentational properties. For example, the plurality of digitized images may be divided into a first batch effect group 110a having digitized images with a blue hue and a second batch effect group 110b having digitized images with a pink hue.

In some embodiments, the grouping tool 108 may place the plurality of digitized images into the plurality of batch effect groups 110a-110b by embedding the image characterization metrics associated with each of the digitized images into a lower dimensional representation (e.g., a two-dimensional representation, a three-dimensional representation, a four-dimensional representation, etc.). The lower dimensional representations for the plurality of digital images may be subsequently plotted as points on a cluster plot. For example, in some embodiments two-dimensional representations for the plurality of digitized images may be plotted as points on a two-dimensional cluster plot. In some additional embodiments, three-dimensional representations for the plurality of digitized images may be plotted as points on a three-dimensional cluster plot. The points on the cluster plot are then clustered with other nearby points to form the plurality of batch effect groups 110a-110b. It will be appreciated that the plurality of batch effect groups 110a-110b may include putative batch effect groups in some cases. This is because the plurality of batch effect groups 110a-110b are formed based upon presumed metrics associated with phenotypical presentation, and therefore may or may not in fact be directly connected to specific batch-effects in all cases.

In other embodiments, the grouping tool 108 may place the plurality of digitized images into the plurality of batch effect groups 110a-110b by using a linear system (e.g., by using linear programming to operate upon a matrix of the image characterization metrics to determine the plurality of batch effect groups 110a-110b). In some such embodiments, the linear system may assign weighting factors to the different image characterization metrics based upon an importance the image characterization metric to determining batch effects.

The partitioning tool 112 is configured to sub-divide digitized images from each of the plurality of different batch effect groups 110a-110b into a training set 114 and/or a validation set 116. For example, a first lot of digitized images associated with the first batch effect group 110a will be placed in the training set 114 and a second lot of the digitized images associated with the first batch effect group 110a will be placed in the validation set 116. Similarly, a third lot of digitized images associated with the second batch effect group 110b will be placed in the training set 114 and a fourth lot of the digitized images associated with the second batch effect group 110b will be placed in the validation set 116. Because different digitized images from each of the plurality of different batch effect groups 110a-110b are sub-divided between the training set 114 and the validation set 116, an entire batch effect group is not assigned to either the training set 114 or the validation set 116, thereby ensuring that each of the training set 114 and the validation set 116 have a mixtures of digitized images from each of the plurality of different batch effect groups 110a-110b.

The training set 114 is provided to a machine learning classifier 118, which is configured to operate upon the training set 114 to train the machine learning classifier 118 to perform an operation. The validation set 116 is subsequently provided to the machine learning classifier 118 to test the operation.

Because the partitioning tool 112 has placed digitized images from respective ones of the plurality of different batch effect groups 110a-110b into the training set 114, the machine learning classifier 118 is trained to operate upon digitized images having different presentational properties associated with different batch effects, and therefore, to take into account the different batch effects. This provides a user with a high level of confidence that a resulting model has been trained across diverse data and will performance consistently across a wide range of incoming data. Similarly, because the partitioning tool 112 has placed digitized images from the plurality of different batch effect groups 110a-110b into the validation set 116, the validation set 116 will enable the machine learning classifier 118 to minimize the potential harm that batch effects may present in a diverse set of digitized images in real world applications (e.g., to a diverse set of images that may be received from a plurality of different hospitals and/or labs).

Figure 2:
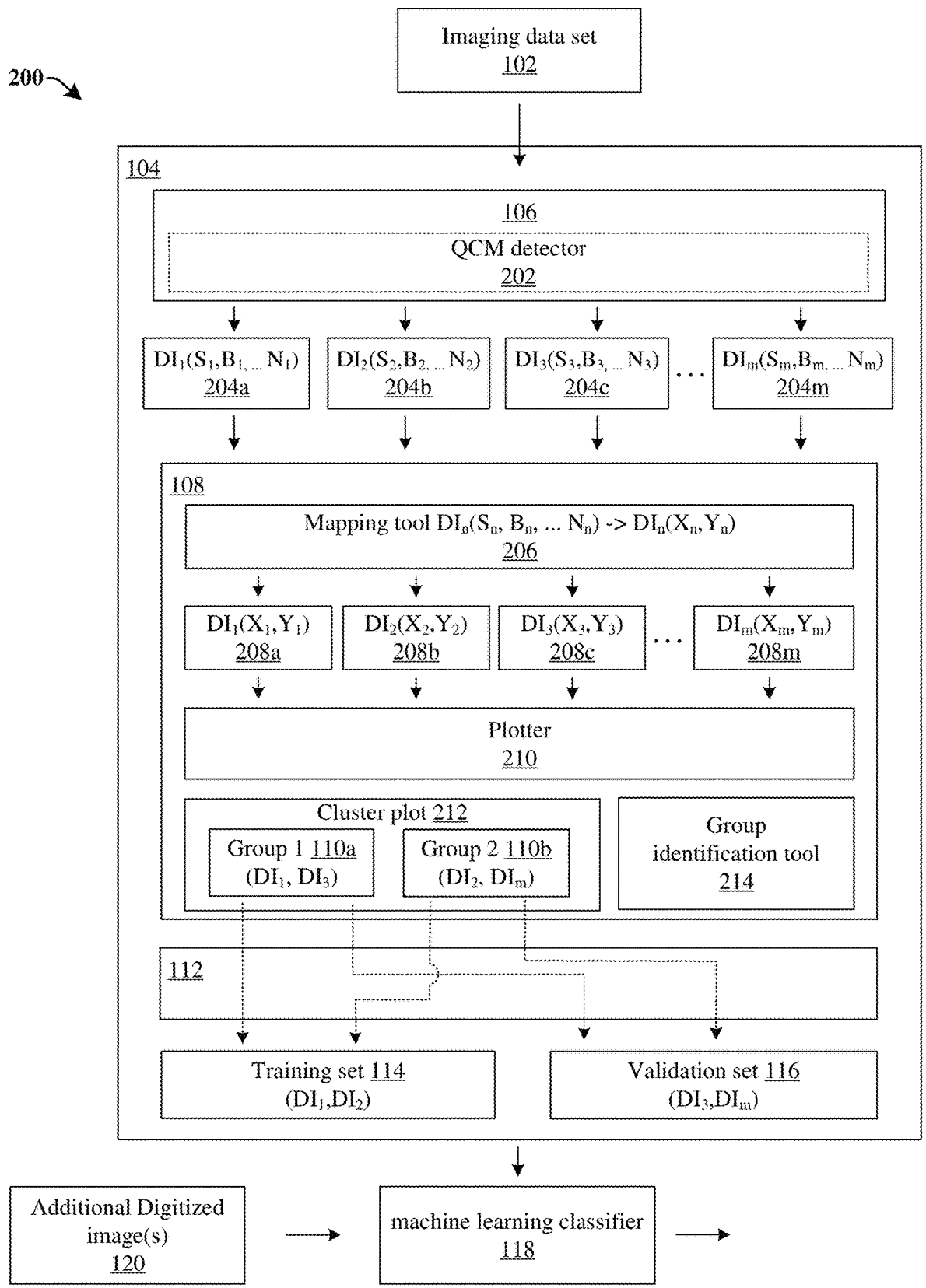
FIG. 2 illustrates some additional embodiments of a block diagram illustrating a method and/or apparatus for mitigating batch effects by utilizing one or more image characterization metrics to systematically partition digitized images into training and validation sets.

FIG. 2 illustrates some additional embodiments of a block diagram 200 illustrating a method and/or apparatus for mitigating batch effects by utilizing one or more image characterization metrics to systematically partition digitized images between training and validation sets.

As shown in block diagram 200, an imaging data set 102 is formed. The imaging data set 102 includes a plurality of digitized images respectively comprising imaging data associated with a patient. In some embodiments, the plurality of digitized images comprise digitized pathology images (e.g., whole slide images (WSIs)) obtained from one or more pathological tissue samples taken from patients. In some embodiments, the digitized pathology image may comprise digitized images of stained biopsy slides (e.g., digitized H&E (Hematoxylin and Eosin) stain images, digitized PAS (periodic acid-Schiff) stain images, or the like). In other embodiments, the plurality of digitized images may comprise digitized scan data taken from radiological images (e.g., images obtained using Magnetic resonance imaging (MRI) scans, computerized tomography (CT) scans, proton emission tomography (PET) scans, or the like). In some embodiments, the plurality of digitized images may comprise organic objects. For example, in various embodiments the plurality of digitized images may comprise digitized images of a colon, a kidney, a lung, a brain, or other body parts (e.g., human body parts, animal body parts). In other embodiments, the digitized images may comprise non-organic objects.

A batch effect mitigation tool 104 is configured to receive the plurality of digitized images from the imaging data set 102. The batch effect mitigation tool 104 is further configured to identify groups of the plurality of digitized images with similar presentational proprieties (e.g., comparable stain and brightness metrics, etc.) and to systematically separate the groups between a training set 114 and a validation set 116. The training set 114 may be used to train a model of a machine learning classifier, while the validation set 116 may be used to determine the model's generalizability performance on previously unseen data not employed during training. In some embodiments, the batch effect mitigation tool 104 comprises an image characterization tool 106, a grouping tool 108, and a partitioning tool 112.

In some embodiments, the image characterization tool 106 may comprise a quality control metric detector 202 configured to determine one or more quality control metrics 204a-204m associated with the plurality of digitized images within the imaging data set 102. For example, the quality control metric detector 202 may determine one or more quality control metrics 204a relating to a first digitized image, one or more quality control metrics 204b relating to a second digitized image, etc. In some embodiments, the one or more quality control metrics 204a-204m for digitized pathology images may comprise stain metrics (e.g., a tissue color, a background color, a stain intensity, etc.), brightness, thickness, contrast, saturation, white balance, microns per pixel, magnification, and/or the like. In other embodiments, the one or more quality control metrics 204a-204m for digitized scan data may comprise CT-acquisition protocols, data preparation differences, or imaging artifacts such as noise, motion, inhomogeneity, ringing, or aliasing. In some embodiments, the quality control metric detector 202 may utilize a quality control tool for digital pathology slides (e.g., HistoQC) to compute relevant quality control metrics for the plurality of digitized images within the imaging data set 102. In other embodiments, the quality control metric detector 202 may utilize a quality control tool for radiological images (e.g., Mrqy) to compute relevant quality control metrics for the plurality of digitized images within the imaging data set 102.

The grouping tool 108 is configured to receive the one or more quality control metrics 204a-204m for each of the plurality of digitized images from the image characterization tool 106. Based upon the one or more quality control metrics 204a-204m, the grouping tool 108 is configured to place the plurality of digitized images into different batch effect groups 110a-110b. In some embodiments, the grouping tool 108 may comprise a mapping tool 206, a plotter 210, and a group identification tool 214.

The mapping tool 206 is configured to receive the plurality of quality control metrics 204a-204m associated with the plurality of digitized images and to embed the quality control metrics 204a-204m into a smaller dimensional sub-space representation (e.g., a two-dimensional sub-space representation, a three-dimensional sub-space representation, etc.). For example, the mapping tool 206 may use a mapping algorithm to map the plurality of quality control metrics 204a-204m into two-dimensional representations 208a-208m of the plurality of quality control metrics 204a-204m. In some embodiments, the quality control metrics 204a-204m may be mapped to a two-dimensional representation using a dimensional reduction technique (e.g., such as UMAP, t-SNE, or the like).

The plotter 210 is configured to receive the smaller-dimensional sub-space representations from the mapping tool 206 and to plot the smaller dimensional sub-space representations onto a cluster plot. For example, the plotter 210 may receive the two-dimensional representations 208a-208m and to plot the two-dimensional representations 208a-208m onto a cluster plot 212. The cluster plot 212 comprises a plurality of points respectively corresponding to one of the plurality of digitized images. The plurality of points have locations that are indicative of presentational properties, so that points that are located near each other are associated with digitized images having similar presentational properties.

The group identification tool 214 is configured to group points within the cluster plot 212 with other nearby points, so as to form a plurality of batch effect groups 110a-110b within the cluster plot 212. The digitized images associated with respective ones of the plurality of batch effect groups 110a-110b have presentational properties that are similar to each other and that are dissimilar to digitized images associated with other ones of the plurality of batch effect groups 110a-110b. In some embodiments, a first batch effect group 110a may be associated with a first plurality of digitized images, a second batch effect group 110b may be associated a second plurality of digitized images, etc. In some embodiments, the group identification tool 214 may identify the plurality of batch effect groups 110a-110b by performing unsupervised clustering (e.g., mean-shift, k-means) on the cluster plot 212. In some embodiments, k-means clustering may be applied to points of the cluster plot 212 to group points which are near each other and generate the batch effect groups 110a-110b. In some embodiments, the formation of the plurality of batch effect groups 110a-110b may be performed at a patient level, such that different regions of interest (ROIs) from the same patient are placed in a same batch effect group, so as to prevent data snooping.

Although FIG. 2 illustrates the plurality of batch effect groups 110a-110b as having two batch effect groups, it will be appreciated that the plurality of batch effect groups 110a-110b may comprise more batch effect groups (e.g., 10 batch effect groups, 20 batch effect groups, 50 batch effect groups, etc.) respectively associated with different presentational properties (e.g., putative batch effects).

A partitioning tool 112 is configured to systematically separate digitized images associated with points within the respective batch effect groups 110a-110b between a training set 114 and a validation set 116. For example, the first plurality of digitized images associated with points within the first batch effect group 110a are separated into a first lot of digitized images that are placed into the training set 114 and into a second lot of digitized images that are placed into the validation set 116. Similarly, the second plurality of digitized images associated with points within the second batch effect group 110b are separated into a third lot of digitized images that are placed into the training set 114 and into a fourth lot of digitized images that are placed into the validation set 116. This systematic segmentation of the plurality of batch effect groups 110a-110b results in both the training set 114 and the validation set 116 having digitized images with similar presentational qualities (e.g., the training set 114 and the validation set 116 will both have digitized images within a light stain and with a dark stain).

The training set 114 is provided to a machine learning classifier 118. The machine learning classifier 118 is configured to perform a machine learning operation on the training set 114. The validation set 116 is subsequently provided to the machine learning classifier 118 to test the machine learning operation. In some embodiments, the machine learning classifier 118 may comprise a deep learning classifier. It will be appreciated that the machine learning classifier 118 can be used to perform a wide range of machine learning operations on the training set 114 and the validation set 116. For example, in various embodiments the machine learning classifier 118 may be configured to identify cancerous segments of digitized images based upon image features, to predict an outcome of a disease from features/components of digitized images, to predict a response to therapy based upon features/components of digitized images, or the like. In some embodiments, the training set 114 and the validation set 116 may be used to train the machine learning classifier 118 for digital pathology applications.

In some embodiments, the partitioning tool 112 is configured to sub-divide digitized images associated with the plurality of batch effect groups 110a-110b in a manner which supports cross-validation type studies. For example, the partitioning tool 112 may sub-divide digitized images associated with the plurality of batch effect groups 110a-110b into n groups for n-fold validation (e.g., n=3, n=4, etc.). During cross-validation, ⅔ of the n-groups may be used for training (e.g., as training sets) and ⅓ of the n-groups may be used for testing (e.g., as testing sets). The n-groups may be changed between training and testing over the course of a cross-validation study. The systematic partitioning of the digitized images according to the disclosed method may mitigate the effect of batch effects that may prevent poor performance of the cross-validation type studies.

In some embodiments, after the machine learning classifier 118 has acted upon the validation set 116, the machine learning classifier 118 may act upon one or more additional digitized images 120 from one or more additional patients. Because the training set 114 and the validation set 116 have digitized images from the different batch effect groups 110a-110b, the machine learning classifier 118 is able to mitigate potential harm of batch effects that may be present in the one or more additional digitized images 120.

Figure 3A:
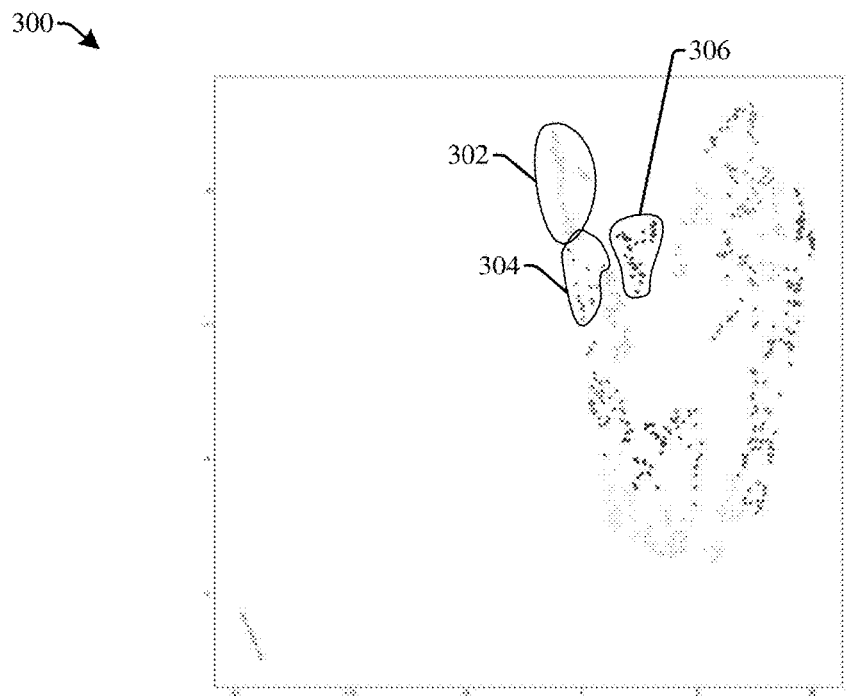
FIG. 3A illustrates some embodiments of a two-dimensional (2D) cluster plot having points respectively corresponding to a 2D representation of image characterization metrics of a digitized image.
Figure 3B:
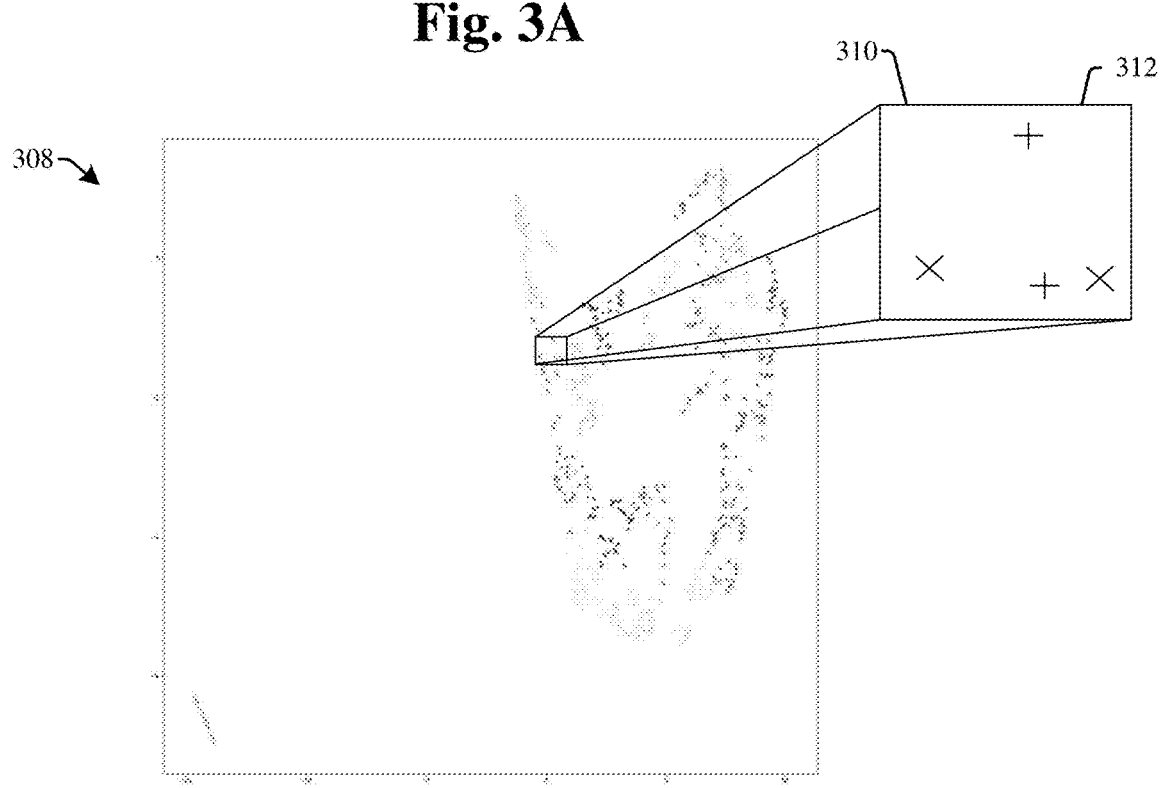
FIG. 3B illustrates some embodiments of a two-dimensional cluster plot having batch effect groups comprising clusters of points that have been separated into training and validation sets.

FIGS. 3A-3B illustrate some embodiments of two-dimensional cluster plots configured to display a two-dimensional representation of image characterization metrics associated with a plurality of digitized images.

FIG. 3A illustrates a two-dimensional (2D) cluster plot 300 comprising a plurality of points arranged on an x-y coordinate system. Respective ones of the plurality of points are associated with a digitized image (e.g., a first point is associated with a first digitized image, a second point is associated with a second digitized image, etc.). In some embodiments, each point represents a whole slide image (WSI) which has had quality control metrics extracted from it (e.g., using HistoQC). The plurality of points have an x-y coordinate that corresponds to a two-dimensional mapping from a plurality of quality control metrics. The x-y coordinate is representative of one or more presentational properties of a corresponding digitized image. Because the x-y coordinate is representative of one or more presentational properties of a digitized image, points that are in close proximity to one another are associated with digitized images having similar presentational properties.

The plurality of points are arranged in a plurality of batch effect groups 302-306 that respectively contain points associated with digitized images having similar presentational properties. In some embodiments, a first batch effect group 302 may contain points associated with digitized images having similar properties to one another, while a second batch effect group 304 may contain points associated with digitized images having similar properties to one another and different properties from digitized images associated with points in the first batch effect group 302. For example, the first batch effect group 302 may contain points associated with digitized images having a predominantly blue hue, while the second batch effect group 304 may contain points associated with digitized images having a predominantly pink hue.

FIG. 3B illustrates a two-dimensional cluster plot 308 having batch effect groups comprising clusters of points that have been separated into training and validation sets.

After forming the plurality of batch effect groups 302-306, a partitioning tool (e.g., 112 of FIG. 2) may separate the plurality of points into different sets. As shown in two-dimensional cluster plot 308, the plurality of points have been replaced with either a "+" and an "x". A. "+" indicates a digitized image that is to be placed in a training set and an "x" indicates a digitized image that is to be placed in a validation set (e.g., a testing set). Since each of the plurality of batch effect groups 302-306 comprise multiple points that have been replaced with a "+" and an "x", both the training set and the validation set will have digitized images that contain many different presentational properties, thereby allowing for a machine learning classifier to be trained and tested in a manner that takes into consideration many different presentational properties.

Figure 4:
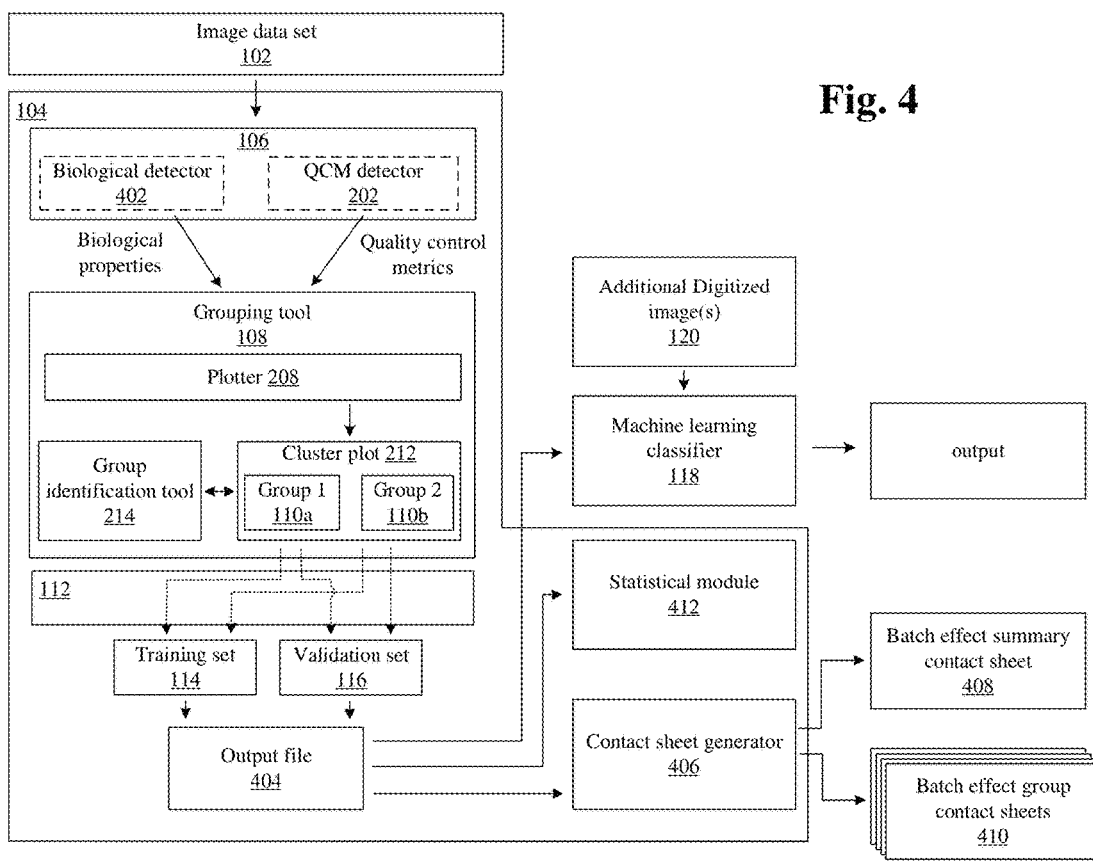
FIG. 4 illustrates some additional embodiments of a block diagram illustrating a method and/or apparatus for mitigating batch effects by utilizing one or more image characterization metrics to systematically partition digitized images into training and validation sets.

FIG. 4 illustrates some additional embodiments of a block diagram 400 of a method and/or apparatus for mitigating batch effects by utilizing one or more image characterization metrics to systematically partition digitized images into training and validation sets.

As shown in block diagram 400, a batch effect mitigation tool 104 is configured to receive a plurality of digitized images within an imaging data set 102. The batch effect mitigation tool 104 is configured to identify groups of digitized images with similar presentational proprieties (e.g., stain metrics, brightness metrics, etc.) and to systematically partition the groups into a training set 114 and a validation set 116. The batch effect mitigation tool 104 comprises an image characterization tool 106, a grouping tool 108, and a partitioning tool 112.

In some embodiments, the image characterization tool 106 may comprise a quality control metric detector 202 and a biological detector 402. The quality control metric detector 202 is configured to extract one or more quality control metrics (e.g., a scanner type, a stain type, etc.) from the plurality of digitized images within the imaging data set 102. The biological detector 402 is configured to extract information relating to biological and/or tissue properties from the plurality of digitized images within the imaging data set 102. In some embodiments, the biological detector 402 may comprise an automated annotation tool. In various embodiments, the biological and/or tissue properties may comprise a number of segmentations within a digitized image, a size of segmentations, a shape of segmentations, a pattern of segmentations, a size of tubules, a level of disease, and/or the like. In some embodiments, the biological detector 402 may utilize an automated annotation tool (e.g., Quick Annotator) to compute biological and/or tissue properties for the plurality of digitized images within the imaging data set 102

The grouping tool 108 is configured to receive quality control metrics of the plurality of digitized images from the quality control metric detector 202 and to further receive information relating to biological and/or tissue properties of the plurality of digitized images from the biological detector 402. Based on the quality control metrics and the information relating to biological and/or tissue properties, the grouping tool 108 is configured to generate a plurality of batch effect groups 110a-110b.

In some embodiments, the grouping tool 108 is configured to generate initial batch effect groups from the quality control metrics and to subsequently sub-divide the initial batch effect groups using the information relating to biological and/or tissue properties to form the plurality of batch effect groups 110a-110b. For example, the grouping tool 108 may utilize the quality control metrics to generate a first initial batch effect group having tissue with a pink hue and a second initial batch effect group having tissue with a blue hue. From the biological properties, the grouping tool 108 may be able to identify disease tissue and healthy tissue based on a shape or pattern of segmentations. The first initial batch effect group may be further segmented based on the presence of disease into a first batch effect group and a second batch effect group, and the second initial batch effect group may be further segmented based on the presence of disease into a third batch effect group and a fourth batch effect group. The use of the information relating to biological and/or tissue properties to form the plurality of batch effect groups 110a-110b may improve a performance of a machine learning classifier trained according to the training set 114 formed by the batch effect mitigation tool 104.

In various embodiments, the grouping tool 108 may receive the quality control metrics and the information relating to the biological and/or tissue properties by loading files (e.g., files generated by the quality control metric detector 202) and/or by accessing a database (e.g., a database maintained by the biological detector 402). In some embodiments, the batch effect mitigation tool 104 may generate an output file 404 (e.g., a tab separated file) containing a list of all of the image files relating to digitized images available in the imaging data set 102. For each image file relating to a digitized image, the output file 404 will denote a membership in either the training set 114 or the validation set 116. The output file 404 may also contain additional metadata. In some embodiments, the additional metadata may include a motivation for a digitized image to be placed within a respective set (e.g., "cohort has 2 images of this MPP, 1 placed in training, and 1 placed in validation").

It will be appreciated that the batch effect mitigation tool 104 may operate on a large number of digitized images in a short period of time. For example, in some embodiments, the batch effect mitigation tool 104 may perform the partitioning of digitized images over a time that is in a range of between approximately 15 seconds and approximately 3 minutes. The relatively short run time allows for the batch effect mitigation tool 104 to be used without significantly degrading an efficiency of the machine learning classifier 118.

In some embodiments, the batch effect mitigation tool 104 may further comprise a contact sheet generator 406. In some embodiments, the contact sheet generator 406 may be configured to produce a batch effect summary contact sheet 408. The batch effect summary contact sheet 408 shows one digitized image from each of the plurality of batch effect groups 110a-110b. For example, the batch effect summary contact sheet 408 may comprise one randomly selected digitized image associated with each of the plurality of batch effect groups 110a-110b, so as to provide a user with an idea of the presentational properties of each of the plurality of batch effect groups 110a-110b. From the batch effect summary contact sheet 408, differences in the presentational properties may be identified between the plurality of batch effect groups 110a-110b.

In some embodiments, the contact sheet generator 406 may also or alternatively be configured to produce a plurality of batch effect group contact sheets 410. The plurality of batch effect group contact sheets 410 respectively show all of the digitized images within one of the plurality of batch effect groups 110a-110b. For example, a first batch effect group contact sheet illustrates a set of all of the digitized images within the first batch effect group 110a, a second batch effect group contact sheet illustrates a set of all of the digitized images within the second batch effect group 110b, etc. Typically, the digitized images have a large size (e.g., greater than 2 Giga-bytes) that utilizes a specialized tool and/or a large amount of time (e.g., 10-20 seconds) to open and/or review. In some embodiments, the contact sheet generator 406 may generate images (e.g., thumbnails) that have a relatively small size that allows them to be included in the plurality of batch effect group contact sheets 410 and to be opened quickly (e.g., in less than 1 second). Therefore, the plurality of batch effect group contact sheets 410 allow for a quick overview of the plurality of batch effect groups 110a-110b. From this plurality of batch effect group contact sheets 410, a quality of the batch effect groups may be evaluated, intra-group similarities may be assessed, errors may be identified, etc.

In some embodiments, the batch effect mitigation tool 104 may further comprise a statistical module 412 configured to perform one or more statistical tests to identify variable confounding in the training set 114 and/or the validation set 116. For example, the statistical module 412 may correlate digitized images from a same batch effect group to an outcome to identify variable confounding associated with a batch effect. For example, if a first group of digitized images (e.g., blue digitized images) from a first site predominately has poor outcomes and a second group of digitized images (e.g., pink digitized images) from a second site predominately has good outcomes, it indicates that variable confounding is occurring within the data (e.g., since it is not possible to determine whether a patient will have a good outcome or a poor outcome just by knowing what site they came from or from what color the tissue is). If batch effects are identified to be associated with a variable, the statistical module 412 may issue a warning that the results of a machine learning classifier trained on such a dataset may be erroneous.

It has been appreciated that one or more of the digitized images that are used to form a training set may not be annotated. The process of annotating data can be expensive in time and/or cost, especially for imaging data sets comprising a large number of digitized images. In some additional embodiments, the partitioning tool 112 is configured generate a training set that comprises a sub-set of training data (i.e., a training sub-set) from the plurality of batch effect groups 110a-110b. The training sub-set contains a small number of digitized images from the plurality of batch effect groups 110a-110b, which could be annotated/labeled first so that a model can be trained more robustly and/or more quickly. For example, if the imaging data set 102 comprises one-hundred digitized images from a first site and one-hundred digitized images from a second site, it would be costly to annotate all two-hundred digitized images. However, the partitioning tool 112 may be configured to subdivide the plurality of batch effect groups 110a-110b to generate a training sub-set that contains one digitized image from the first site and one digitized image from the second side (e.g., and not 2+ images only from the first site). The two digitized image within the training sub-set can be subsequently annotated and then used to bootstrap a machine learning model in a low-cost manner. In some embodiments, the training sub-set may be used to bootstrap the machine learning model, while a larger training set 114 may be subsequently formed by partitioning tool 112 and used for additional training by a larger training set 114. By generating the training sub-set by taking a small number of digitized images (e.g., one digitized image) from the plurality of different batch effect groups 110a-110b, the partitioning tool 112 to quickly generate a training sub-set that is able to robustly train a machine learning classifier.

Figure 5:
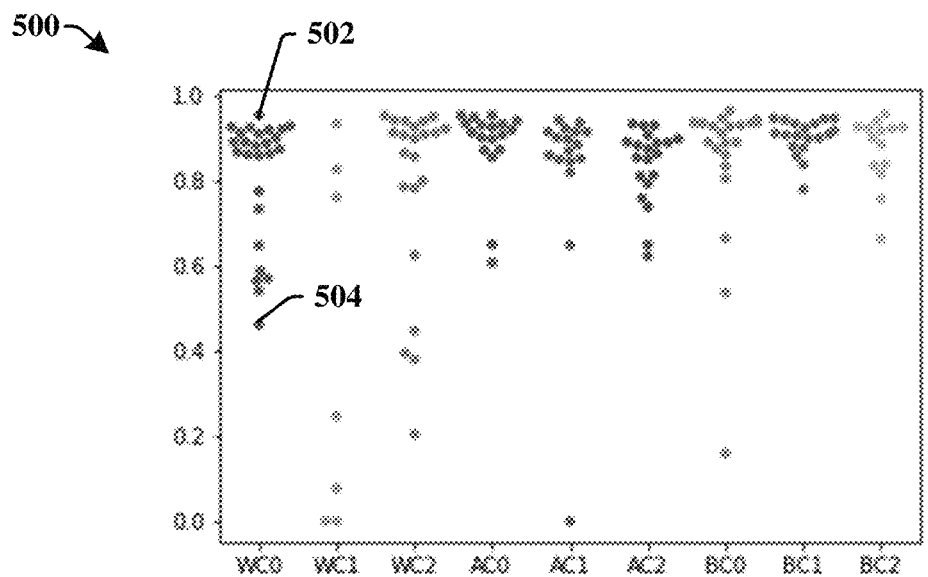
FIGS. 5-6 illustrate some examples of graphs showing performance comparisons between machine learning classifiers trained using datasets formed by different methods.
Figure 6:
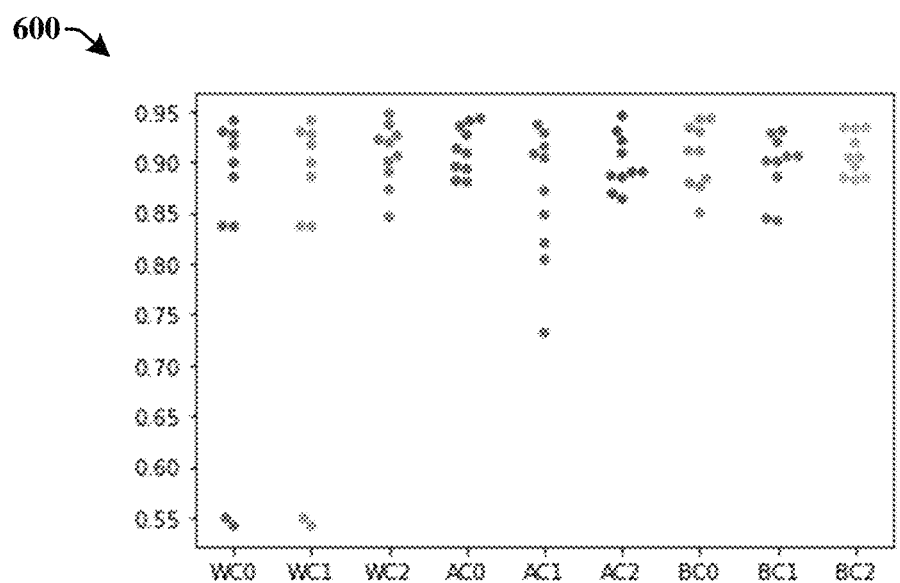

It will be appreciated that the disclosed method and apparatus of utilizing one or more image characterization metrics (e.g., quality control metrics) to systematically partition imaging data sets between training and validation sets results in improved performance for downstream machine learning classifiers. For example, FIGS. 5-6 illustrate some exemplary graphs showing a performance of a machine learning classifier that was trained with different training sets formed according to different manners of data partitioning on a same imaging data set. The graphs shown in FIGS. 5-6 are generated based on segmentations of digitized images comprising renal WSIs of proximal tubules (e.g., 47 WSI from 20 sites). The renal WSIs were manually segmented into a binary mask to generate a ground truth. The digitized images were also provided to a machine learning classifier as three different groups (e.g., 3 different worst case groups having testing and validation sets with different batch effects, three different average case groups having testing and validation sets formed by random partitioning, and 3 different groups having testing and validation sets formed according to the disclosed method).

Graph 500 of FIG. 5 shows testing results of a machine learning operation trained on different training sets and tested on validation sets having different digitized images. As shown in graph 500, the x-axis denotes different groups formed by different manners of data partitioning. The y-axis denotes an accuracy of a segmentation. The plurality of points associated with each manner of data partitioning denotes an accuracy of a segmentation performed by a machine learning classifier on a different digitized image. For example, point 502 is the accuracy of an automated segmentation performed by a machine learning classifier on a first digitized image, point 504 is the accuracy of an automated segmentation performed by a machine learning classifier on a second digitized image, etc. An accuracy of 1.0 is the highest (e.g., indicating complete agreement between the ground truth and the automated segmentation), while an accuracy of 0 is the lowest (e.g., indicating no agreement between the ground truth and the automated segmentation).

In the automated segmentations performed by a machine learning classifier trained on worst-case training sets ($WC_1$-$WC_3$)(e.g., training sets that contain digitized images from a single source and/or batch effect group), there is a relatively high degree of variability and a lower accuracy. For example, the automated segmentations performed by a machine learning classifier trained on the worst-case training sets may have an average accuracy of approximately 75% with a variability of +/−28%. In the automated segmentations performed by the machine learning classifier trained on average case training sets ($AC_1$-$AC_3$) (e.g., training sets that contain digitized images randomly selected from one or more groups having different batch effects), there is a lower degree of variability and a higher accuracy. For example, the automated segmentations performed by a machine learning classifier trained on the average case training sets may have an average accuracy of approximately 85% with a variability of +/−15%. The automated segmentations performed by the machine learning classifier trained on the training sets ($BC_1$-$BC_3$) formed by the disclosed method achieve a lowest degree of variability and a highest degree of accuracy. For example, the automated segmentations performed by a machine learning classifier trained on the training sets formed by the disclosed method may have an average accuracy of approximately 87% with a variability of +/−13%.

Graph 600 of FIG. 6 shows additional shows testing results of a machine learning operation trained on different training sets and tested a same validation set having same digitized images. The automated segmentations performed by the machine learning classifier trained on worst-case training sets ($WC_1$-$WC_3$) may have an average accuracy of approximately 85% with a variability of +/−17%, the automated segmentations performed by the machine learning classifier trained on average case training sets ($AC_1$-$AC_3$) may have an average accuracy of approximately 89% with a variability of +/−5%, and the automated segmentations performed by the machine learning classifier trained on the training sets ($BC_1$-$BC_3$) formed by the disclosed method may have an average accuracy of approximately 90% with a variability of +/−3%.

Therefore, using the disclosed method of data partitioning guarantees higher performance and lower variability. Furthermore, it ensures that the worst-case scenario is avoided, thereby avoiding poor results that could lead to misdiagnoses.

Figure 7A:
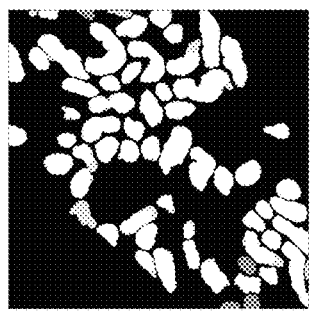
FIGS. 7A-7C illustrate some examples of segmented digitized images formed by machine learning classifiers trained using datasets formed by different methods.
Figure 7B:
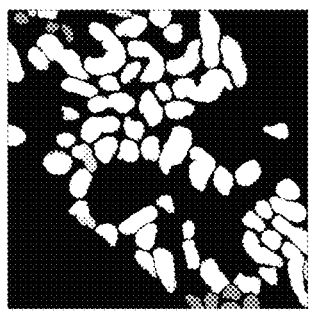
Figure 7C:
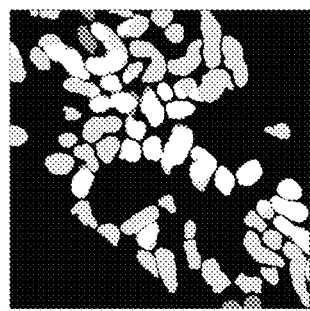

FIGS. 7A-7C illustrate figures of segmented PAS (periodic acid-Schiff) slides that show a comparison between a ground truth (e.g., a manual segmentation done by a trained medical expert) and an automated segmentation of a machine learning classifier trained on different training sets.

FIG. 7A illustrates a FIG. 700 of a segmented PAS slide showing both a ground truth (in white) and a result of a machine learning classifier trained with a first training set. In the result, green indicates missed segmentations and pink indicates falsely identified segmentations. The first training set is a "worse case" training set, which comprises a training set that contains digitized images that come from a different batch effect group (e.g., a different lab and/or hospital, etc.) than the validation set. For example, the training set may comprise digitized images that come from a batch effect group having a predominantly blue hue, while the validation set may comprise digitized images that come from a batch effect group having a predominately pink hue. As shown in FIG. 700, the automated segmentation of the machine learning classifier illustrates significant deviations from the ground truth. The automated segmentation correctly identifies approximately 53.2% of the segmentations of the ground truth.

FIG. 7B illustrates a FIG. 702 of a segmented PAS slide showing both a ground truth and a result of a machine learning classifier trained with a second training set. The second training set is an "average case" training set, which comprises a training set and a validation set that contains digitized images that are randomly selected from one or more groups having different batch effects (e.g., a different lab and/or hospital, etc.). As shown in FIG. 702, the automated segmentation of the machine learning classifier illustrates deviations from the ground truth. The automated segmentation correctly identifies approximately 90.9% of the segmentations of the ground truth.

FIG. 7C illustrates a FIG. 704 of a segmented PAS slide showing both a ground truth and a result of a machine learning classifier trained with a third training set. The third training set is formed using the disclosed method, so that a training set and a validation set contain digitized images that are systematically selected from different batch effect groups (e.g., a different lab and/or hospital, etc.). As shown in FIG. 7B, the automated segmentation of the machine learning classifier illustrates deviations from the ground truth. The automated segmentation correctly identifies approximately 91.1% of the segmentations of the ground truth.

Therefore, the disclosed method and/or apparatus provides for an improvement in accuracy of automated segmentation over both the first training set and the second training set. Furthermore, while the random data partitioning of digitized images may provide for a good result (e.g., as shown in FIG. 7B) it may also provide for a poor result (e.g., a result that is close to the "worst case" result of FIG. 7A) due to the nature of the random data partitioning. Therefore, the disclosed method also provides for an improvement in the consistency of the automated segmentation, so as to avoid the worst-case result.

Figure 8:
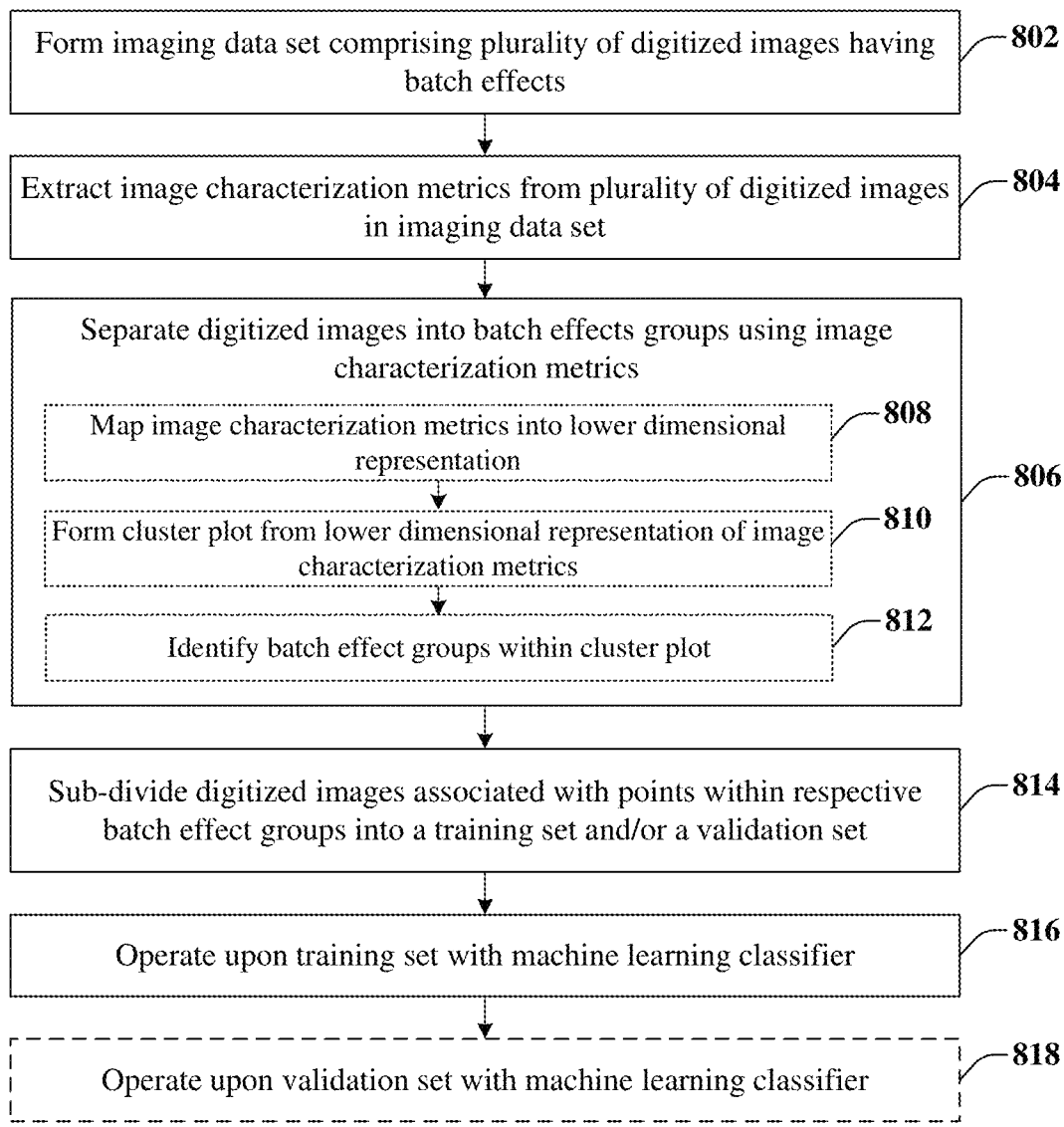
FIG. 8 illustrates some embodiments of a flow diagram of a method of mitigating batch effects by utilizing one or more image characterization metrics to systematically partition digitized images into training and/or validation sets.

FIG. 8 illustrates some embodiments of a flow diagram of a method 800 of mitigating batch effects by utilizing one or more image characterization metrics to systematically partition digitized images into training and validation sets.

While method 800 is illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 9:
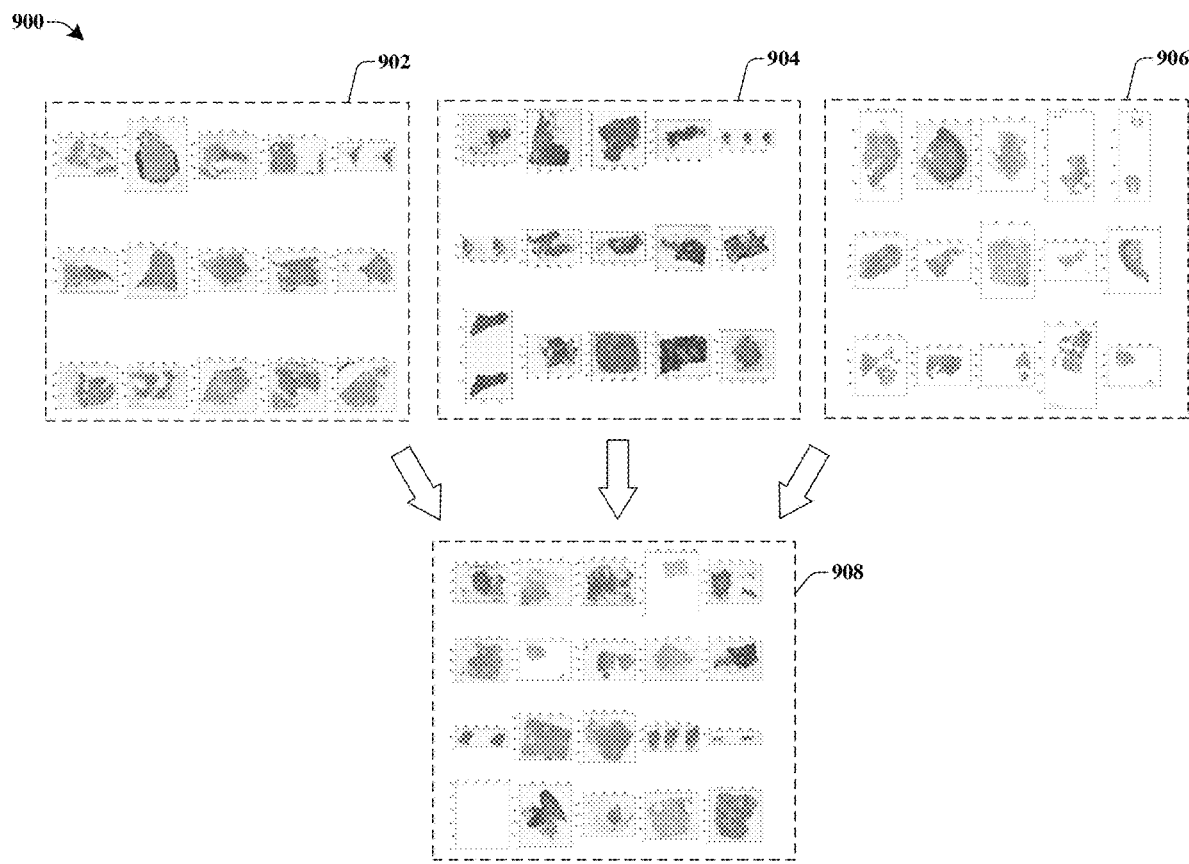
FIG. 9 illustrates some embodiments of a method of forming an imaging data set comprising a plurality of digitized images.

At act 802, an imaging data set is formed to comprise a plurality of digitized images having batch effects. In various embodiments, the imaging data set may comprise images that were collected from different sites (e.g., different hospitals, labs, research institutions, etc.), from different scanners, and/or the like. The imaging data set may be formed by collecting scan data from radiological scans and/or by collecting digitized biopsy data from digitized biopsy slides (e.g., H&E slides). FIG. 9 illustrates some embodiments of digitized images 900 showing formation of an imaging data set corresponding to act 802.

Figure 10:
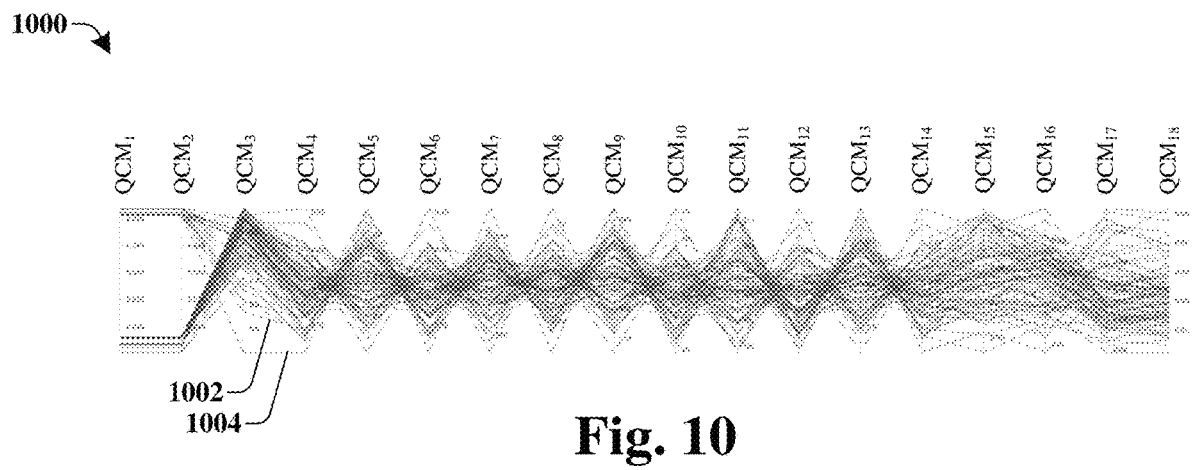
FIG. 10 illustrates some embodiments of a graph showing a plurality of quality control metrics for a plurality of digitized images.

At act 804, one or more image characterization metrics are extracted from the plurality of digitized images in the imaging data set. In various embodiments, the one or more image characterization metrics may comprise quality control metrics (e.g., stain metrics, brightness metrics, thickness, contrast, saturation, white balance, or the like), information relating to biological and/or tissue properties, and/or the like. FIG. 10 illustrates some embodiments of a graph 1000 illustrating quality control metrics for a plurality of digitized images corresponding to act 804.

At act 806, the plurality of digitized images are placed into batch effects groups, which have similar presentational properties, based upon the one or more image characterization metrics. In some embodiments, the plurality of digitized images may be placed into batch effects groups according to acts 808-812. In other embodiments, the plurality of digitized images may be placed into batch effects groups using a linear system (e.g., using linear programming to operate upon a matrix of the image characterization metrics to determine the plurality of different batch effect groups).

At act 808, the one or more image characterization metrics are mapped into a lower dimensional representation (e.g., a two-dimensional representation).

Figure 11:
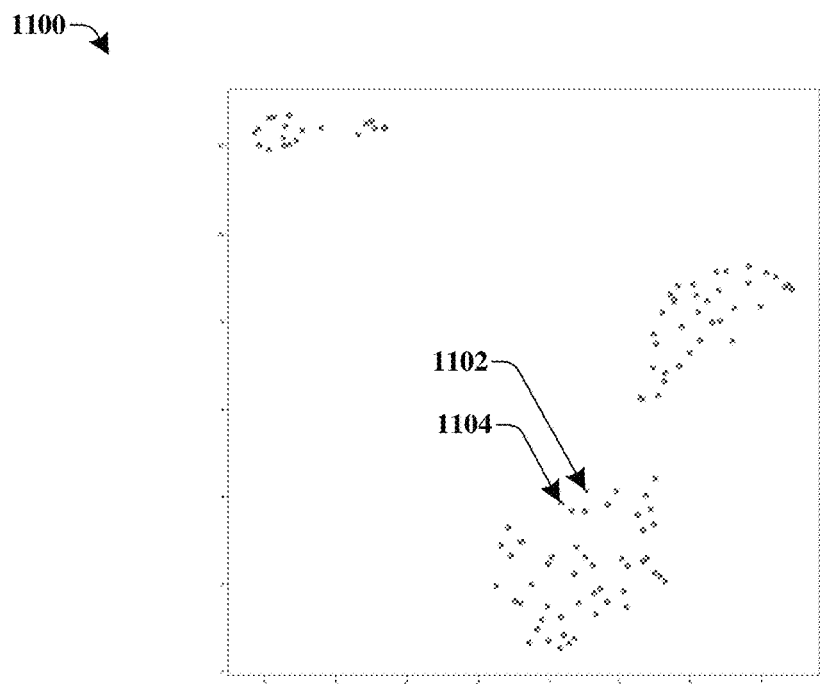
FIG. 11 illustrates some embodiments of a two-dimensional cluster plot representing quality control metrics of a plurality of digitized images in a two-dimensional space.

At act 810, a cluster plot (e.g., a two-dimensional cluster plot) is formed from the lower dimensional representation of the one or more image characterization metrics. FIG. 11 illustrates some embodiments of a two-dimensional cluster plot 1100 representing quality control metrics of a plurality of digitized images in a two-dimensional space corresponding to act 810.

Figure 12:
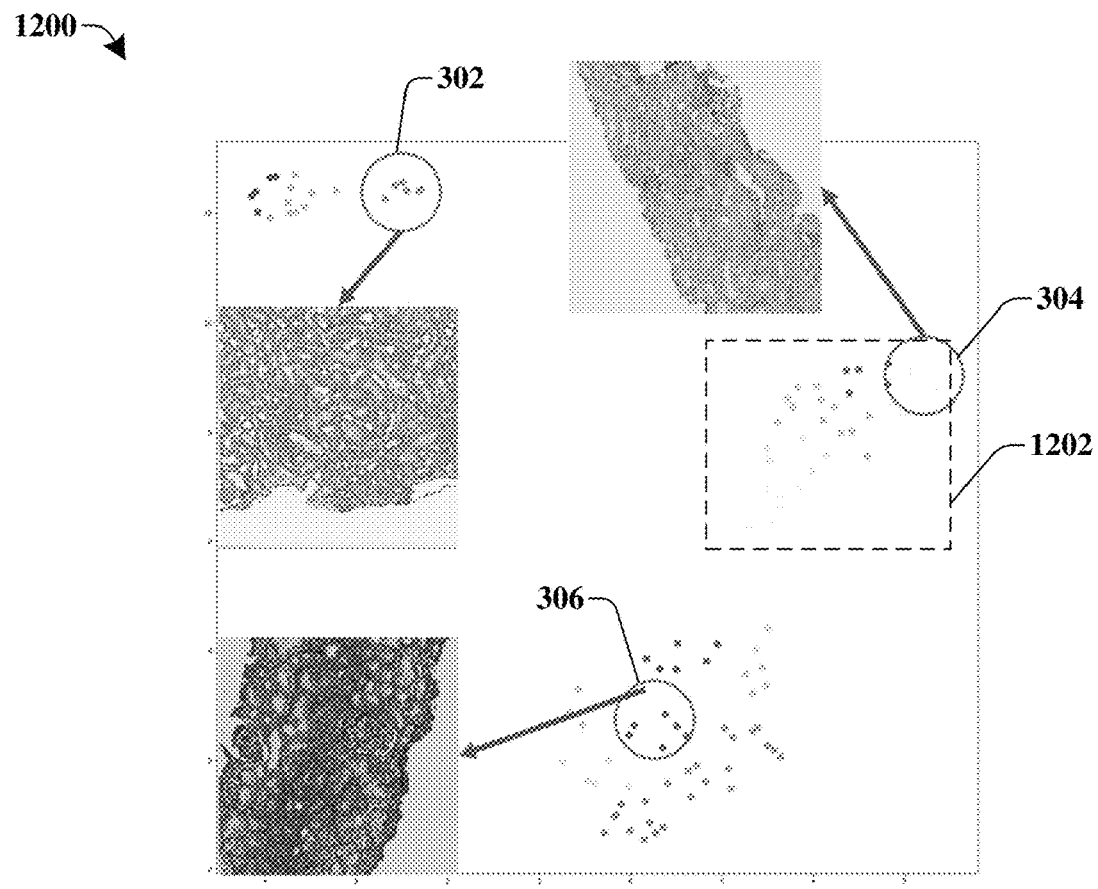
FIG. 12 illustrates some embodiments of a two-dimensional cluster plot comprising batch effect groups having clusters of points with similar presentational properties.

At act 812, a plurality of batch effects groups, which have similar presentational properties, are identified within the cluster plot. FIG. 12 illustrates some embodiments of a two-dimensional cluster plot 1200 corresponding to act 812.

Figure 13:
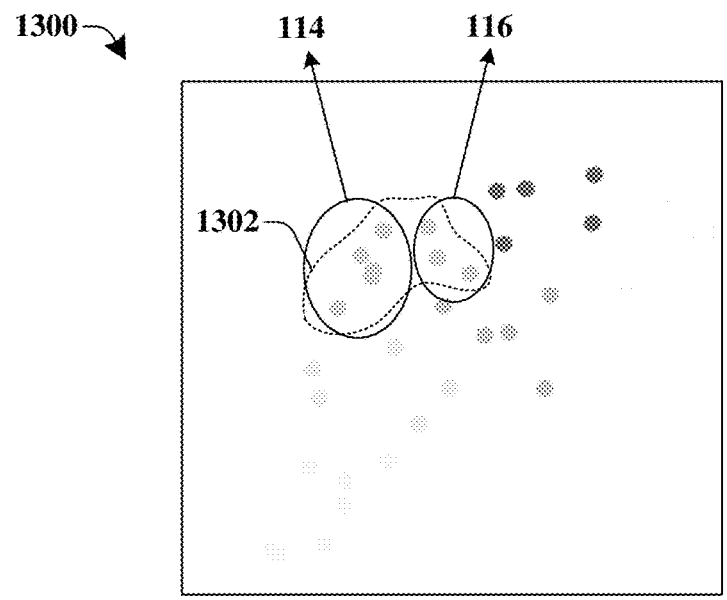
FIG. 13 illustrates some embodiments of a two-dimensional cluster plot comprising a batch effect group having points that are separated into a training set and a validation set.

At act 814, digitized images associated with respective ones of the plurality of batch effects groups are respectively sub-divided into a training set and/or a validation set. FIG. 13 illustrates some embodiments of a two-dimensional cluster plot 1300 corresponding to act 814.

At act 816, the training set is operated upon with a machine learning classifier.

At act 818, the validation set may be operated upon with the machine learning classifier.

Although the disclosed method and/or apparatus is described in relation to imaging data sets that include digitized images comprising digitized pathology slides and/or radiological images (e.g., CT images, MR images, PET images, etc.), it will be appreciated that the method and/or apparatus are not limited to such applications. Rather, the disclosed method and/or apparatus may also be applied to other data sets in other domains (e.g., sequencing data) within which features associated with a putative batch effect can be determined. For example, in some embodiments the disclosed method and/or apparatus may be applied to data sets that comprise Ribonucleic acid (RNA) data, Deoxyribonucleic acid (DNA) data, or the like. In such embodiments, the disclosed method and/or batch effect mitigation tool (e.g., 104) is configured to receive a data set having sequencing data for a plurality of sequences (e.g., DNA sequences, RNA sequences, etc.), to detect characterization metrics of the plurality of sequences, and to generate a plurality of batch effect groups based on the characterization metrics. The batch effect groups are subsequently sub-divided into a training set and/or a validation set.

In some embodiments, the method 800 of FIG. 8 may be implemented as computer executable instructions. Thus, in one example, a computer-readable storage device may store computer executable instructions that if executed by a machine (e.g., computer, processor) cause the machine to perform methods or operations described or claimed herein including method 800. While executable instructions associated with the method 800 are described as being stored on a computer-readable storage device, it is to be appreciated that executable instructions associated with other example methods or operations described or claimed herein may also be stored on a computer-readable storage device. In different embodiments the example methods or operations described herein may be triggered in different ways. In one embodiment, a method or operation may be triggered manually by a user. In another example, a method or operation may be triggered automatically.

FIG. 9 illustrates some embodiments of digitized images 900 showing formation of an imaging data set. The formation of the imaging data set may correspond to some embodiments of act 802 in FIG. 8.

As shown in FIG. 9, a plurality of image sets 902-906 comprise digitized images having different presentational properties. In some embodiments, the digitized images within the plurality of image sets 902-906 may comprise whole slide images (WSIs) obtained by imaging (e.g., scanning) slides of stained pathology samples. The plurality of image sets 902-906 may respectively comprise digitized images formed at different sites (e.g., hospitals, labs, etc.) having different attributes that lead to the different presentational properties. For example, a first image set 902 may comprise digitized images from a first hospital having a first brand of scanner, a second image set 904 may comprise digitized images from a second hospital having a second brand of scanner that is different than the first brand of scanner, and a third image set 906 may comprise digitized images from a third hospital having a third brand of scanner.

The plurality of image sets 902-906 are brought together to form an imaging data set 908. Because the imaging data set 908 comprises a plurality of digitized images collected from the plurality of image sets 902-906, the imaging data set 908 includes digitized images comprising batch effects. In various embodiments, the imaging data set 908 may include different digitized images having different hues (e.g., a first digitized image having a pink hue, a second digitized image having a blue hue), different digitized images having different thicknesses, etc.

FIG. 10 illustrates some embodiments of a graph 1000 showing a plurality of quality control metrics extracted from a plurality of digitized images. The graph 1000 may correspond to some embodiments of act 804 in FIG. 8.

As shown in FIG. 10, the graph 1000 shows quality control metrics $QCM_1$-$QCM_{18}$ for a plurality of different digitized images. Each line 1002-1004 corresponds to a single digitized image and each of the y-axes is a different one of the quality control metrics $QCM_1$-$QCM_{18}$. The quality control metrics $QCM_1$-$QCM_{18}$ of the different digitized images vary, so that the set of quality control metrics of the different digitized images are different. In some embodiments, the quality control metrics $QCM_1$-$QCM_{18}$ may comprise stain metrics (e.g., a tissue color, a background color, a stain intensity, etc.), brightness metrics, thickness, contrast, saturation, white balance, microns per pixel, an amount of blue in an image, an amount of red in an image, magnification, and/or the like.

FIG. 11 illustrates some embodiments of a two-dimensional cluster plot 1100 representing the quality control metrics of the plurality of digitized images in a two-dimensional space. The two-dimensional cluster plot 1100 may correspond to some embodiments of act 808 in FIG. 8.

As shown in FIG. 11, the two-dimensional cluster plot 1100 comprises a plurality of points 1102-1104. The plurality of points 1102-1104 respectively correspond to a two-dimensional representation of the quality control metrics (e.g., $QCM_1$-$QCM_{18}$ of FIG. 10) of one of the plurality of digitized images. For example, a first digitized image may comprise a set of 18 quality control metrics. The 18 quality control metrics may be mapped to a two-dimensional representation (e.g., embedded within a two-dimensional representation), which is described by an x-value and a y-value, using a mapping algorithm. The two-dimensional representation corresponds to the quality control metrics so that a position of a point is representative of presentational properties of a corresponding digitized image (e.g., so that digitized images having similar quality control metrics over the plurality of quality control metrics in FIG. 10 are spatially close together in the two-dimensional cluster plot 1100). In some embodiments, the quality control metrics may be mapped to a two-dimensional representation using a dimensional reduction technique (e.g., such as UMAP, t-SNE, or the like).

FIG. 12 illustrates some embodiments of a two-dimensional cluster plot 1200 comprising a plurality of batch effect groups 302-306. The two-dimensional cluster plot 1200 may correspond to some embodiments of act 810 in FIG. 8.

As shown in FIG. 12, a plurality of batch effect groups 302-306 are identified. In some embodiments, the plurality of batch effect groups 302-306 are identified as having different colors in the two-dimensional cluster plot 1200. The plurality of batch effect groups 302-306 respectively comprise a plurality of points that are associated with digitized images that have similar presentational properties to other digitized images associated with the batch effect group and different presentational properties compared to digitized images associated with other batch effect groups. For example, points within a first batch effect group 302 are associated with digitized images having similar presentational properties (e.g., tissue with a light blue color on an off-white background) to one another, while points within a second batch effect group 304 are associated with digitized images having similar presentational properties (e.g., tissue with a pink color on a white background) to one another and dissimilar presentational properties to digitized images associated with the points in the first batch effect group 302. By clustering the points together, the batch effects of the digitized images are able to be identified without manually sorting through the plurality of digitized images.

The plurality of batch effect groups 302-306 may be formed by applying a clustering algorithm to the points within the two-dimensional cluster plot 1200. In various embodiments, the clustering algorithm may perform unsupervised clustering, semi-supervised cluster, or supervised clustering. In some embodiments, the clustering algorithm may comprise a k-means algorithm, a mean-shift algorithm, or the like.

FIG. 13 illustrates some embodiments of a two-dimensional cluster plot 1300 comprising a region of the two-dimensional cluster plot 1200 of FIG. 12. In some embodiments, the two-dimensional cluster plot 1300 may correspond to region 1202 of FIG. 12. The two-dimensional cluster plot 1300 may correspond to some embodiments of act 814 in FIG. 8.

As shown in FIG. 13, points within each of the batch effect groups 1302 of the plurality of batch effect groups are separated between a training set 114 and a validation set 116. By separating points from each of the plurality of batch effect groups (e.g., 302-306 of FIG. 12) between a training set 114 and a validation set 116, the training set 114 and the validation set 116 comprise digitized images from the different ones of the plurality of batch effect groups. By forming both the training set 114 and the validation set 116 to have digitized images from the different ones of the plurality of batch effect groups, a machine learning classifier will be able to be trained over a wide range of digitized images having various batch effects, thereby mitigating a negative impact of batch effects.

In some embodiments, within each of the plurality of batch effect groups the points may be replaced with a "x" or a "+". Replacement of a point with a "+" indicates a digitized image to be placed in the trainings set 114 and replacement of a point with an "x" indicates a digitized image to be placed in the validation set 116. Therefore, the digitized images associated with each of the plurality of batch effect groups are separated between the training set 114 and the validation set 116.

Figure 14:
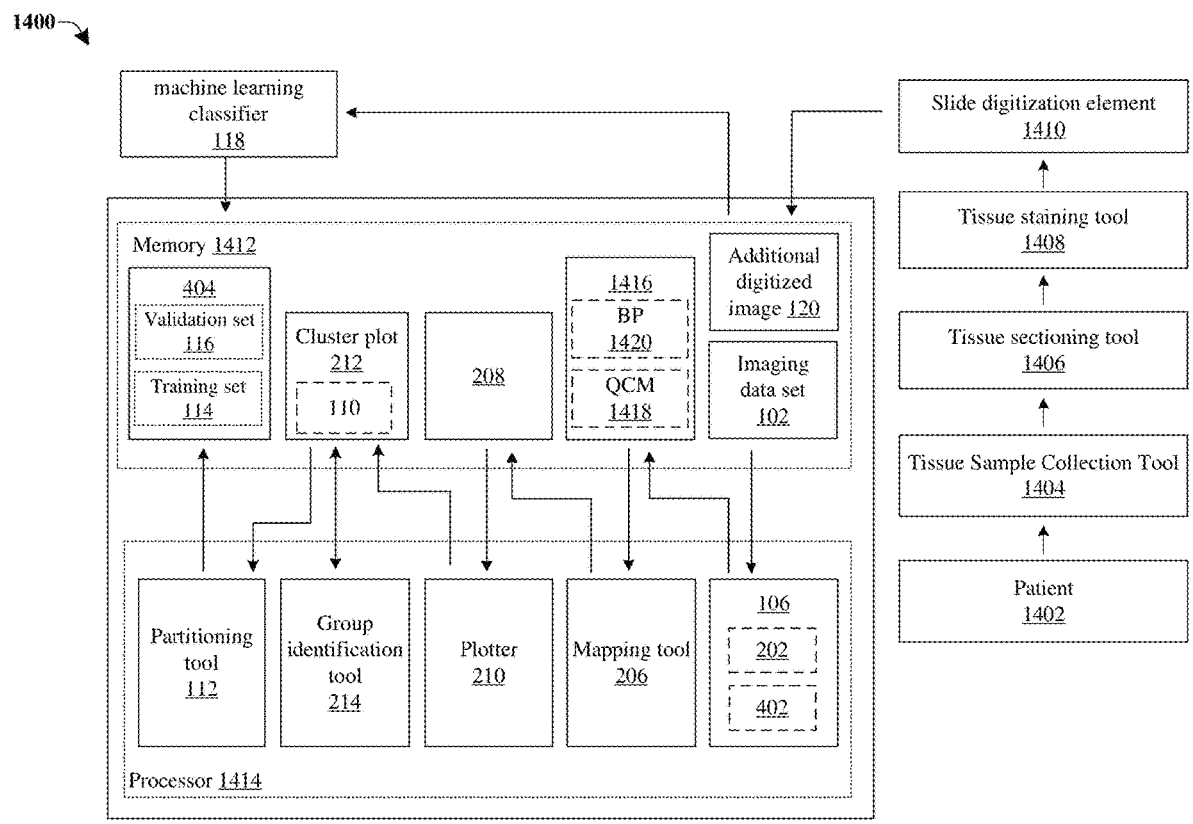
FIG. 14 illustrates some embodiments of a block diagram showing a batch effect mitigation apparatus configured to utilize one or more image characterization metrics to systematically partition digitized images into training and/or validation sets.

FIG. 14 illustrates some additional embodiments of a block diagram showing a batch effect mitigation apparatus 1400 configured to utilize one or more image characterization metrics to systematically partition digitized images into training and validation sets.

The batch effect mitigation apparatus 1400 comprises a memory 1412 and a processor 1414. In various embodiments, the memory 1412 may comprise one or more different memory elements. The memory 1412 may include main memory, disk storage, or any suitable combination thereof. The memory 1412 may include, but is not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, or solid-state storage The processor 1414 may, in one embodiment, include circuitry such as, but not limited to, one or more single-core or multi-core processors. The processor 1414 may include any combination of general-purpose processors and dedicated processors (e.g., graphics processors, application processors, etc.). The processors may be coupled with or may include memory (e.g., memory 1412) or storage and may be configured to execute instructions stored in the memory 1412 or storage to enable various apparatus, applications, or operating systems to perform the operations.

In some embodiments, the memory 1412 is configured to store an imaging data set 102 comprising a plurality of digitized images having batch effects. In some embodiments, the plurality of digitized images may be obtained from an on-line compendium, from a number of different sources (e.g., different labs and/or hospitals), and/or the like.

In some embodiments, the processor 1414 may comprise an image characterization tool 106 configured to access the plurality of digitized images within the imaging data set 102 and to extract one or more image characterization metrics 1416 from respective ones of the plurality of digitized images. In some embodiments, the image characterization tool 106 may comprise a quality control metric detector 202 (e.g., HistQC) configured to extract one or more quality control metrics from the plurality of digitized images within the imaging data set 102. In some additional embodiments, the image characterization tool 106 may further comprise a biological detector 402 configured to extract information relating to biological and/or tissue properties from the plurality of digitized images within the imaging data set 102

The memory 1412 is configured to store image characterization metrics 1416. In some embodiments, the image characterization metrics 1416 may comprise quality control metrics 1418 relating to systematic technical differences, not related to biological variation, in the plurality of digitized images. In some additional embodiments, the image characterization metrics 1416 may further comprise biological properties 1420 relating to biological features of the digitized images (e.g., a number of segmentations within a digitized image, a size of segmentations, a shape of segmentations, a pattern of segmentations, a size of tubules, a level of disease, and/or the like).

The processor 1414 further comprises a mapping tool 206, a plotter 210, a group identification tool 214, and a partitioning tool 112. The mapping tool 206 is configured to map the image characterization metrics 1416 into a lower dimensional representation 208 (e.g., a two-dimensional representation, a three-dimensional representation, a four-dimensional representation, etc.) and the plotter 210 is configured to plot the lower dimensional representation 208 associated with the plurality of digitized images in a cluster plot 212. The group identification tool 214 is configured to access the cluster plot 212 and to identify a plurality of batch effect groups 110 within the cluster plot 212. The partitioning tool 112 is configured to partition the plurality of batch effect groups 110 in manner that separates digitized images associated with the plurality of batch effect groups 110 between a training set 114 and a validation set 116. In some embodiments, the lower dimensional representation 208, the cluster plot 212, the plurality of batch effect groups 110, the training set 114, and the validation set 116 may be stored in the memory 1412.

In some embodiments, an additional digitized image 120 may be stored in the memory 1412. The additional digitized image 120 may be obtained from an additional patient. In some embodiments, the additional digitized image 120 may be obtained by taking a tissue sample from the additional patient 1402 using a tissue sample collection tool 1404 (e.g., a cannular, forceps, needle, punch, or the like). The tissue sample (e.g., tissue block) is provided to a tissue sectioning tool 1406. The tissue sectioning tool 1406 is configured to slice a tissue sample into thin slices that are placed on transparent slides (e.g., glass slides). A tissue staining tool 1408 is subsequently configured to apply one or more stains (e.g., H&E stains) to the thin slices of the tissue sample to generate biopsy slides. The biopsy slides are subsequently converted by a slide digitization element 1410 to a plurality of whole slide images comprising digitized biopsy data. In some embodiments, the slide digitization element 1410 may comprise an image sensor (e.g., a photodiode, CMOS image sensor, or the like) that is configured to capture a digital image of the pathology slides (e.g., biopsy slides).

Accordingly, the present disclosure relates to a batch effect mitigation method and/or apparatus that utilizes one or more image characterization metrics to systematically partition batch effect groups of digitized images having similar presentational properties between training and validation sets In some embodiments, the present disclosure relates to a non-transitory computer-readable medium storing computer-executable instructions that, when executed, cause a processor to perform operations, including extracting one or more image characterization metrics from respective ones of a plurality of digitized images within an imaging data set, the plurality of digitized images having batch effects; identifying a plurality of batch effect groups of the digitized images using the one or more image characterization metrics; and partitioning the plurality of batch effect groups into a training set and/or a validation set, the training set and the validation set both having some of the plurality of digitized images associated with respective ones of the plurality of batch effect groups.

In other embodiments, the present disclosure relates to a batch effect mitigation apparatus, including an image characterization tool configured to extract one or more image characterization metrics from a plurality of digitized images within an imaging data set; a group identification tool configured to utilize the one or more image characterization metrics to identify a plurality of batch effect groups within the plurality of digitized images; and a partitioning tool configured to sub-divide digitized images associated with the plurality of batch effect groups into a training set and/or a validation set, the training set and the validation set both having one or more digitized images associated with respective ones of the plurality of batch effect groups.

In yet other embodiments, the present disclosure relates to a method for mitigating batch effects in a dataset, including extracting a plurality of quality control metrics from respective ones of a plurality of digitized images within an imaging data set; mapping the plurality of quality control metrics associated with a respective digitized image of the plurality of digitized images into a two-dimensional representation of the respective digitized image; plotting a plurality of two-dimensional representations of the plurality of digitized images as points on a two-dimensional cluster plot; identifying a plurality of batch effect groups within the two-dimensional cluster plot, the plurality of batch effect groups having clusters of the points that are spatially close to one another; partitioning digitized images associated with the plurality of batch effect groups between a training set and a validation set, the training set and the validation set both having some of the digitized images associated with respective ones of the plurality of batch effect groups; and utilizing the training set and the validation set to train a machine learning classifier for digital pathology applications.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random-access memory (RAM), a read only memory (ROM), a memory chip or card, a memory stick, and other media from which a computer, a processor or other electronic device can read.

"Circuit", as used herein, includes but is not limited to hardware, firmware, software in execution on a machine, or combinations of each to perform a function(s) or an action(s), or to cause a function or action from another logic, method, or system. A circuit may include a software controlled microprocessor, a discrete logic (e.g., ASIC), an analog circuit, a digital circuit, a programmed logic device, a memory device containing instructions, and other physical devices. A circuit may include one or more gates, combinations of gates, or other circuit components. Where multiple logical circuits are described, it may be possible to incorporate the multiple logical circuits into one physical circuit. Similarly, where a single logical circuit is described, it may be possible to distribute that single logical circuit between multiple physical circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable medium storing computer-executable instructions that, when executed, cause a processor to perform operations, comprising:
    extracting one or more image characterization metrics from respective ones of a plurality of digitized images within an imaging data set, wherein the plurality of digitized images have batch effects;
    identifying a plurality of batch effect groups of the digitized images using the one or more image characterization metrics;
    partitioning the digitized images within the plurality of batch effect groups into a training set and a validation set, wherein the training set and the validation set respectively comprise some of the plurality of digitized images associated with respective ones of the plurality of batch effect groups;
    utilizing the training set to train a machine learning classifier for digital pathology applications; and
    operating the machine learning classifier upon the validation set after using the training set to train the machine learning classifier.

2. The non-transitory computer-readable medium of claim 1,
    wherein the plurality of batch effect groups comprise a first batch effect group and a second batch effect group;
    separating a first plurality of digitized images associated with the first batch effect group between the training set and the validation set; and
    separating a second plurality of digitized images associated with the second batch effect group between the training set and the validation set.

3. The non-transitory computer-readable medium of claim 1, wherein the operations further comprise:
    providing an additional digitized image to the machine learning classifier after training the machine learning classifier.

4. The non-transitory computer-readable medium of claim 1, wherein the imaging data set comprises image sets from a plurality of different sites.

5. The non-transitory computer-readable medium of claim 1, wherein the one or more image characterization metrics comprise a plurality of quality control metrics.

6. The non-transitory computer-readable medium of claim 5, wherein the plurality of quality control metrics comprise one or more of a tissue color, a background color, a brightness, a contrast, microns per pixel, or magnification.

7. The non-transitory computer-readable medium of claim 5, wherein the one or more image characterization metrics further comprise information related to biological or tissue properties.

8. The non-transitory computer-readable medium of claim 1, wherein the plurality of digitized images comprise digitized pathology slides.

9. The non-transitory computer-readable medium of claim 1, wherein the operations further comprise:
    mapping the one or more image characterization metrics associated with the respective ones of the plurality of digitized images into a two-dimensional representation;
    forming a two-dimensional cluster plot comprising a plurality of points corresponding to two-dimensional representations of the plurality of digitized images; and
    identifying the plurality of batch effect groups within the two-dimensional cluster plot, wherein the plurality of batch effect groups comprise points that are spatially close to one another.

10. A method for mitigating batch effects in a dataset, comprising:
    extracting a plurality of quality control metrics from respective ones of a plurality of digitized images within an imaging data set;
    mapping the plurality of quality control metrics associated with a respective digitized image of the plurality of digitized images into a two-dimensional representation of the respective digitized image;
    plotting a plurality of two-dimensional representations of the plurality of digitized images as points on a two-dimensional cluster plot;
    identifying a plurality of batch effect groups within the two-dimensional cluster plot, wherein the plurality of batch effect groups comprise clusters of the points that are spatially close to one another;
    partitioning digitized images associated with the plurality of batch effect groups between a training set and a validation set, wherein the training set and the validation set both comprise some of the digitized images associated with respective ones of the plurality of batch effect groups; and utilizing the training set and the validation set to train a machine learning classifier for digital pathology applications.

11. The method of claim 10, wherein the plurality of batch effect groups are identified using unsupervised clustering.

12. The method of claim 10, further comprising:
generating a batch effect summary contact sheet comprising one digitized image associated with respective ones of the plurality of batch effect groups.

13. The method of claim 10, further comprising:
generating a plurality of batch effect group contact sheets, wherein the plurality of batch effect group contact sheets respectively comprise all digitized images associated with one of the plurality of batch effect groups.

14. The method of claim 10, further comprising:
forming an output file that comprises a list of image files relating to the plurality of digitized images within the imaging data set, wherein the output file denotes a membership in either the training set or the validation set for each of the image files.

15. The method of claim 10, wherein the plurality of digitized images comprise digitized images of slides formed from pathology samples.

16. A method, comprising:
extracting one or more image characterization metrics from digitized images having batch effects;
identifying a first group of the digitized images having a first batch effect and a second group of the digitized images having a second batch effect using the one or more image characterization metrics;
separating the first group of the digitized images into a training set and a validation set;
separating the second group of the digitized images into the training set and the validation set; and
operating a machine learning classifier upon one or more of the training set and the validation set to train the machine learning classifier.

17. The method of claim 16, wherein the one or more image characterization metrics comprise one or more of a tissue color, a background color, a brightness, a contrast, microns per pixel, and a magnification.

18. The method of claim 16, further comprising:
forming a cluster plot comprising a plurality of points corresponding to the one or more image characterization metrics associated with respective ones of the digitized images; and
identifying the first group of the digitized images and the second group of the digitized images using the cluster plot, wherein the first group of the digitized images and the second group of the digitized images are respectively represented by points that are spatially close to one another.

19. The method of claim 16, further comprising:
mapping the one or more image characterization metrics associated with respective ones of the digitized images into a two-dimensional representation;
forming a two-dimensional cluster plot comprising a plurality of points corresponding to two-dimensional representations of the digitized images; and
identifying the first group of the digitized images and the second group of the digitized images using the two-dimensional cluster plot, wherein the first group of the digitized images and the second group of the digitized images are respectively represented by points that are spatially close to one another.

20. The method of claim 16, wherein the digitized images include digitized pathology images or radiology images.

* * * * *